United States Patent [19]

Austin

[11] Patent Number: 5,556,694
[45] Date of Patent: Sep. 17, 1996

[54] FACEPLATE FOR A TOUCH-SENSITIVE VIDEO DISPLAY UNIT

[75] Inventor: R. Russel Austin, Novato, Calif.

[73] Assignee: Photran Corporation, Lakeville, Minn.

[21] Appl. No.: 350,968

[22] Filed: Dec. 7, 1994

[51] Int. Cl.$^6$ ..................................................... B32B 7/00
[52] U.S. Cl. ........................... 428/212; 428/213; 428/216; 428/333; 428/699; 428/701; 428/702; 428/201; 428/209; 359/582; 359/585; 359/586
[58] Field of Search ........................... 428/212, 213, 428/201, 333, 334, 689, 699, 701, 702, 632, 209, 216; 359/580, 582, 585, 586

[56] References Cited

U.S. PATENT DOCUMENTS

| | | |
|---|---|---|
| 4,422,721 | 12/1983 | Hahn et al. |
| 4,977,013 | 12/1990 | Ritchie et al. ........................ 428/212 |
| 5,225,273 | 7/1993 | Mikoshiba et al. ..................... 428/323 |
| 5,239,152 | 8/1993 | Caldwell et al. ....................... 200/600 |
| 5,395,698 | 3/1995 | Neuman et al. ......................... 428/428 |

*Primary Examiner*—Patrick Ryan
*Assistant Examiner*—Marie R. Yamnitzky
*Attorney, Agent, or Firm*—R. Russel Austin

[57] ABSTRACT

A faceplate for a touch-sensitive display includes, on an outermost surface, a pattern of electrode-regions separated by spaces. A base-coating is deposited on the surface and extends continuously over the surface. The electrode-regions are formed from a layer of a conductive transparent metal-oxide deposited on the base-coating. The electrode-regions and spaces are overcoated by a protective-layer of an insulating material. For light incident on the faceplate at about normal incidence photopic reflectivity in the protective-layer-overcoated electrode-regions is within plus or minus ten percent of photopic reflectivity in the protective-layer-overcoated spaces.

14 Claims, 5 Drawing Sheets

FACEPLATE FOR A TOUCH-SENSITIVE VIDEO DISPLAY UNIT

TECHNICAL FIELD OF THE INVENTION

The present invention relates generally to faceplates for display systems. It relates in particular to faceplate including a transparent electrode system including electrodes separated by insulating spaces, the electrodes and spaces having substantially the same reflectivity and color.

DISCUSSION OF BACKGROUND ART

In a system controlled by or depending on a visual display it is common to provide touch-sensitive virtual switches or controls for operator interaction with the system. Such controls replace mechanical equivalents such as buttons or levers, and are believed, among other potential advantages, to provide for a more natural interaction between the operator and the system.

One such group of controls or switches change in electrical impedance when touched by the operator's finger. The controls typically include an electrically-conductive layer deposited on an outermost faceplate of a visual display screen. The electrically-conductive layer forms a resistive or capacitive element of the switch. The system is provided with electrical circuitry which senses the impedance change, identifies which switch or control was touched and implements system instructions accordingly.

The electrically-conductive layer is often formed from a transparent electrically-conductive metal-oxide. A group of metal-oxides commonly used for such layers includes indium-tin oxide (ITO), cadmium-tin oxide, antimony-doped tin oxide, and fluorine-doped tin oxide. While such layers are optically transparent they have a relatively high refractive index, which, depending on factors including a method by which they are formed, have a refractive index for visible light between about 1.9 and 2.2. Such a high refractive index imparts a relatively high reflectivity to layers formed from these materials, even when the layer is relatively thin. Because of this, the switches are readily distinguishable from a substrate on which they are formed even when no graphic outline or identification is provided.

In a simple form, such switches may take the form of relatively large (larger than a fingertip) regions which are actually designed to simulate a mechanical switch, button, lever or the like. In this form it is not a disadvantage that the switches are visible, as, in this form, the switch is usually provided with a graphic outline or identification as part of a display design.

In a more complex form, the switches are designed to substitute for the action of mechanical cursor keys or a mouse in controlling a visual (video) display of text or graphic matter. In this form, the switches may take the form of a regular pattern of spaced-apart electrode-regions formed on a cathode-ray tube (CRT) faceplate. The electrode-regions and spaces therebetween have dimensions generally smaller than a fingertip. Size of the electrode-regions and spacing therebetween determines, at least in part, accuracy with which a location of a point of the screen which is touched by an operator can be determined.

This complex form is not often used in a touch-sensitive video display, at least partly because electrode-regions thereof are readily distinguishable as a regular pattern overlaying the display. They are distinguishable because of a different reflectivity value or reflection color of the electrode-regions and intervening spaces. Such a pattern can be distracting to an operator of the video display.

A commonly used touch detection arrangement for a touch-sensitive video display has a transparent electrode extending continuously over the faceplate of the video display, and relies on features such as complex peripheral busbar arrangements and electronic circuitry to determine touch location. While such an arrangement does not create a distracting pattern, it may be less accurate or more subject to error than an arrangement including discrete electrode-regions as described above.

SUMMARY OF THE INVENTION

It is an object of the present invention to provide a faceplate for a touch-sensitive video display, the faceplate having a pattern of spaced-apart electrode-regions on an outermost surface thereof, and the electrode-regions not being visually detectable by casual or incidental observation. The video display may be provided by a CRT, a Liquid Crystal Display (LCD) or any other video display devices adapted to display textual or graphic information, or still or moving video images.

In one aspect of the present invention, the above and other objects of the present invention are accomplished by a faceplate comprising a transparent substrate having a transparent base layer deposited on a selected surface thereof. The base layer extends continuously over the selected surface and has a thickness between about 70 and 110 nanometers (nm).

A pattern of co-planar, spaced-apart electrode-regions is formed on the base layer. The electrode-regions are formed from a transparent electrically-conductive layer having a thickness between about 8 and 25 nm, and have spaces therebetween. A transparent protective dielectric (electrically-insulating) layer, having a thickness not less than about 250 nm covers the electrode-regions and the spaces.

The transparent electrically-conductive layer has a refractive index between about 1.9 and 2.2 and an extinction coefficient less than 0.1. The base layer is a layer of a transparent dielectric material having a refractive index greater than the refractive index of the substrate and less than the refractive index of the conductive layer. The protective layer has a refractive index less than the refractive index of the base-layer, and preferably less than the refractive index of the substrate.

In one preferred embodiment of the present invention, the base layer includes aluminum oxide ($Al_2O_3$). The transparent conductive layer preferably includes an electrically-conductive metal-oxide selected from the group consisting of indium-tin oxide, cadmium-tin oxide, antimony-doped tin oxide, and fluorine-doped tin oxide. The protective layer is preferably a layer of silicon dioxide ($SiO_2$).

In a faceplate in accordance with this preferred embodiment of the present invention, the protective-layer-coated electrode-regions have a first photopic reflectivity and the protective-layer-coated spaces have a second photopic reflectivity. For light incident on the faceplate at about normal incidence, the first photopic reflectivity has a magnitude between about ten percent greater than and ten percent less than the magnitude of the second photopic reflectivity. The first and second photopic reflectivities preferably have a magnitude between about 2.5 and 3.0 percent.

Further, the protective-layer-coated electrode-regions have a first reflection color and the protective-layer-covered spaces have a second reflection color. The first and second reflection colors, for Commission International d'Écairage (CIE) Illuminant "C" light at normal incidence, have CIE (1931) x and y chromaticity coordinates preferably lying within a range $0.22<x<0.29$ and $0.15<y<0.3$.

A combination of closely matched reflectivities and a limited color range defined by the above-referenced chromaticity coordinates can be effective in causing the electrode-region pattern to be undetectable under normal use conditions of the faceplate.

In another aspect of the present invention, a base-coating including at least three layers is deposited on the selected surface of the substrate. The three layers of the base-coating may be designated the first, second and third, numbered consecutively beginning with the layer furthest from the selected surface. The first layer has a refractive index less than the refractive index of the first transparent conductive layer and greater than the refractive index of the substrate. The second layer has a refractive index greater than the refractive index of the first layer. The third layer has a refractive index less than the refractive index of the first transparent conductive layer and greater than the refractive index of the substrate.

In another embodiment of the present invention, the first layer of the three-layer base-coating is formed from a dielectric material for electrically isolating the electrode-regions from one another. The second layer is formed from a transparent electrically-conductive metal-oxide layer which serves as a ground-plane for the electrode-regions. Aluminum oxide is one preferred material for the first and third layers. The material of the second layer preferably includes an electrically-conductive metal-oxide selected from the group consisting of indium-tin oxide, cadmium-tin oxide, antimony-doped tin oxide, and fluorine-doped tin oxide.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
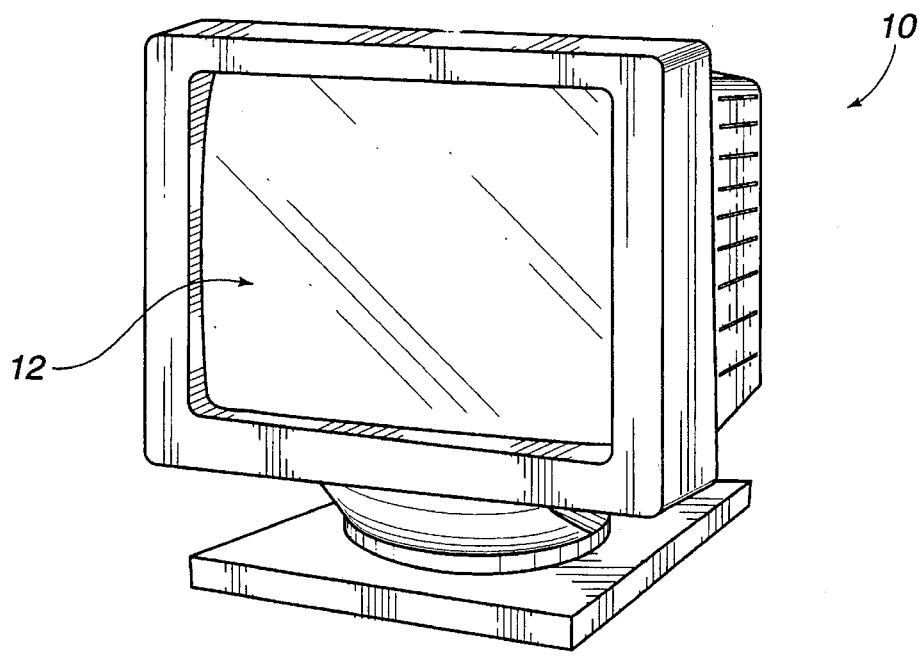
FIG. 1 is a perspective view schematically illustrating a video display unit incorporating a CRT faceplate in accordance with the present invention.

Turning now to the drawings, wherein like components are designated by like reference numerals, FIG. 1 illustrates a video display unit (VDU) 10 including a CRT (not visible in its entirety) having a CRT faceplate 12 in accordance with the present invention. Faceplate 12 may be an integral part of the CRT, incorporated in the CRT when the CRT is manufactured. Alternatively, faceplate 12 may be a separate unit, bonded to the CRT after the CRT is manufactured. As discussed above, a faceplate in accordance with the present invention is not limited to use with a CRT but may be used with any interactive display device adapted to presenting textual or graphic information or still or moving video images.

Figure 2:
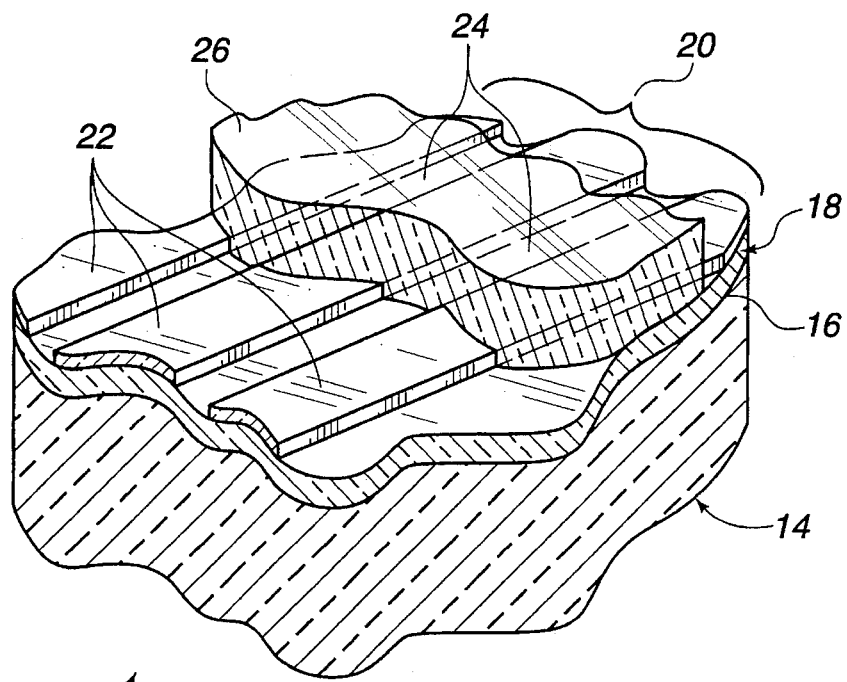
FIG. 2 is a fragmentary perspective view schematically illustrating a portion of the CRT faceplate of FIG. 1 including a substrate, a base-coating deposited on the substrate, co-planar adjacent electrode-regions formed on the base-coating and having spaces therebetween, and a protective layer coated over the electrode-regions and the spaces.

Referring now to FIG. 2, faceplate 12 comprises a transparent substrate 14, preferably, but not necessarily of glass. Substrate 14 preferably has a refractive index between 1.50 and 1.55 at a wavelength of about 520 nm, but this should not be construed as a limiting range. In examples of embodiments of the present invention presented hereinafter, substrate 14 is assumed to have a refractive index of about 1.52 at a wavelength of 520 nm. Refractive index values of other layers and materials used in constructing a faceplate in accordance with the present invention are values at about 520 nm unless otherwise specified.

On surface 16 of substrate 14 is deposited a base-coating 18. As described in detail hereinafter, base-coating 18 may be a single layer of a transparent insulating (dielectric) material, or may include three or more layers, one of which may be of a transparent electrically-conductive material.

An electrode arrangement 20 is formed on base-coating 18. Electrode arrangement 20 includes a pattern of spaced-apart, co-planar electrode-regions 22, separated by spaces 24. Electrode-regions 22 may be interconnected at the periphery of faceplate 12 in any manner. As the present invention is directed primarily to optical aspects of faceplate 12, a discussion of electrode interconnections is not presented herein. Several different electrode-region patterns and electrical interconnection thereof are known in the touch-sensitive display art. By way of example, an interconnection method wherein narrow electrode-regions extend horizontally across a display and are joined at alternate ends to form a single serpentine electrode is disclosed in U.S. Pat. No. 5,149,918.

Continuing now with reference to FIG. 2, a protective layer 26 (shown only partially in FIG. 2) is deposited (or formed) over electrode-regions 22 and spaces 24. Protective layer 26 is provided primarily to prevent damage to electrode-regions 22. As discussed hereinafter, however, optical characteristics of layer 26 may be selected to provide reduced reflection from faceplate 12.

Protective layer 26 preferably has a thickness of at least 250 nm, and most preferably has a thickness between about 420 and 520 nm. Protective layer 26 preferably has a refractive index less than the refractive index of substrate 14.

It is pointed out here that drawings herein which depict layers 18, 22 and 26 do not have comparable horizontal and vertical scale. For example, in practice, a space 22 may have a width on the order of hundreds of micrometers (μm) while layer 26 may have a thickness of 0.5 μm (500 nm). Because of this, layer 26 may be deposited or formed in a single operation, and will have the same thickness in both electrode-regions 22 and spaces 24. This is an important characteristic of the present invention.

Figure 3:
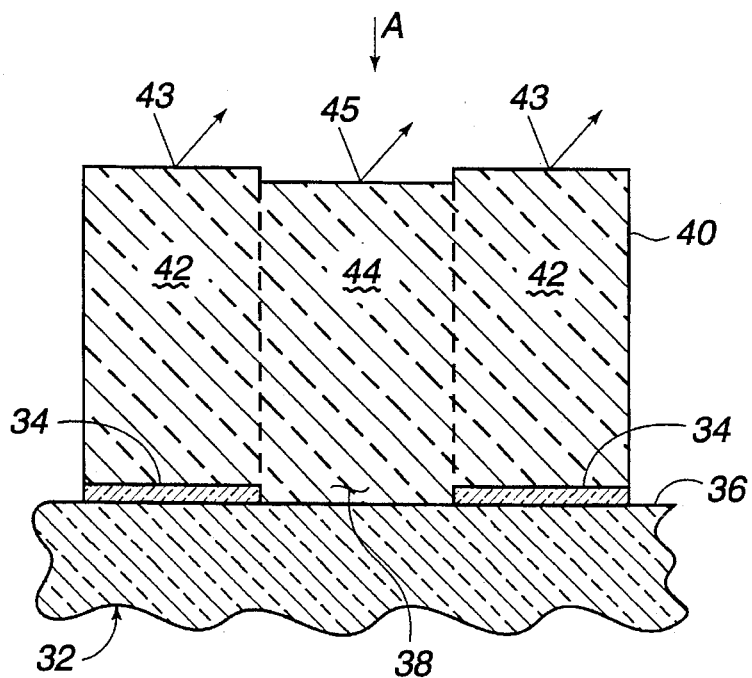
FIG. 3 is a general cross-section view schematically illustrating a portion of a prior art faceplate having electrode-regions formed directly on a transparent substrate and having a space therebetween, and including a protective layer deposited over the electrode-regions and the space.

Before proceeding further with the detailed description of the present invention, it is instructive to consider a prior art arrangement for forming an electrode pattern on a faceplate. Such an arrangement is depicted in FIG. 3. Here, a substrate 32 has electrode-regions 34 deposited on a surface 36 thereof. Electrode-regions 34 are spaced apart, providing a space 38 therebetween. Electrode-regions 34 and space 38 are covered with a transparent protective-layer 40. In practice, electrode-regions would typically be formed by coating surface 36 in its entirety with a layer of an electrically-conductive material and etching the layer to form a pattern of electrode-regions and spaces. A common thickness for a layer forming electrode-regions 34 is between about 8 and 25 nm.

It will be evident to those familiar with the art to which the present invention pertains that, when observed in a direction indicated generally in FIG. 3 by arrow A, protective-layer-coated electrode-regions (designated generally by numeral 42) and protective-layer-coated spaces (designated generally by numeral 44) will have different reflection values, designated respectively by arrows 43 and 45. Further, color of light reflected from regions 42 and 44 can be expected to be different.

Figure 4:
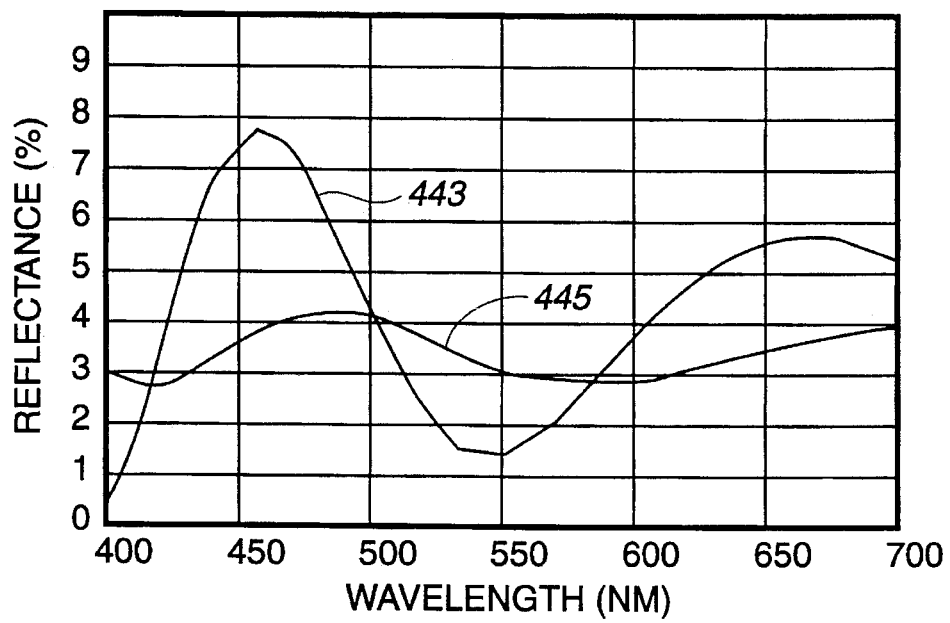
FIG. 4 is a graph schematically illustrating reflection as a function of wavelength for the protective-layer-coated electrode-regions and space of FIG. 3.

Referring now to FIG. 4, computed reflection (at normal incidence) as a function of wavelength for regions 42 (curve 443) and 44 (curve 445) are shown for a system in accordance with FIG. 3 wherein electrode-regions 34 are ITO layers having a thickness of 10 nm and protective-layer 40 is an SiO₂ layer having a thickness of 500 nm. Curves 443 and 445 are often referred to as spectral response curves, and provide one means of determining performance factors of an multilayer optical coating. Photopic reflection and color characteristics of a coating can be computed from a spectral response curve by well documented methods.

Curve 443 has a computed photopic reflection of 2.82 percent, and curve 445 has a computed photopic reflection of about 3.25 percent. From curves 443 and 445 it can be determined that (at normal incidence) light reflected from regions 42 would have a reddish-purple color and light reflected from regions 44 would have a greenish-white color. This difference in photopic reflection value and difference in reflection color would make regions 42 and 44 readily distinguishable from each other. It is pointed out here that even if two adjacent regions have the same photopic reflectivity, if the reflection color of the two regions is significantly different, as exemplified above, the regions may still be distinguishable one from another.

Figure 5:
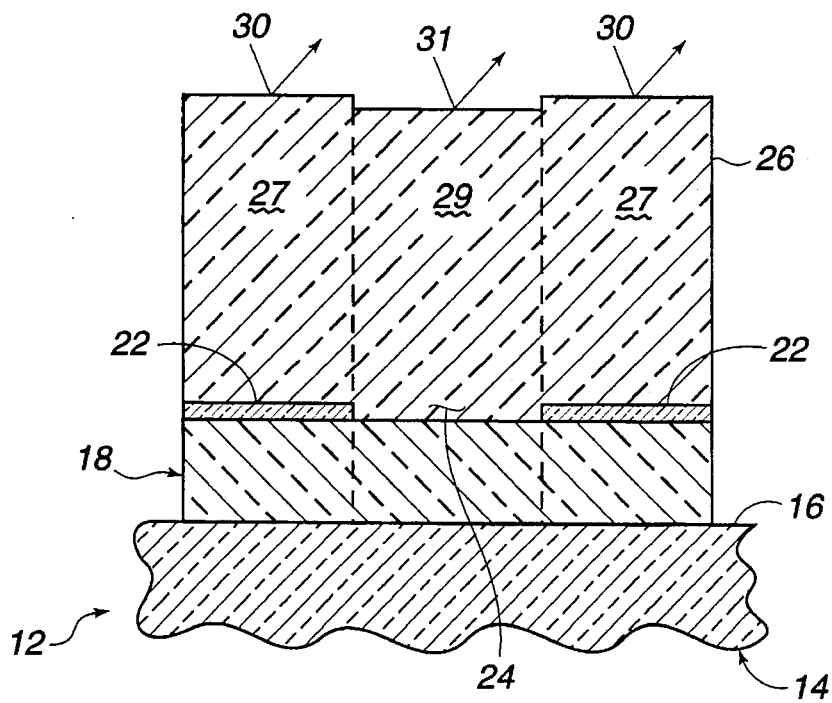
FIG. 5 is a general cross-section view schematically illustrating a portion of the faceplate of FIG. 2, wherein the base-coating comprises only one layer.

Returning now to the detailed description of the present invention, FIG. 5 depicts one preferred embodiment of the present invention in which base-coating 18 is a single layer. As discussed above with reference to FIG. 2, electrode-regions (or layers) 22 are formed on base-coating 18 leaving a space 24 between the electrode-layers.

It is important that layer 18 have a refractive index higher than the refractive index of substrate and also have an optical thickness greater than one-quarter wavelength of visible light and less than one-half wavelength of visible light. Protective-layer 26 has a refractive index less than the refractive index of base layer 18, and preferably has a refractive index less than the refractive index of substrate 14. Protective-layer-coated electrode-regions and spaces are designated generally by numerals 27 and 29 respectively. Reflection from regions 27 and 29 are indicated by arrows 30 and 31 respectively.

Having selected materials for layers 18, 22 and 26 one method of arriving at effective specific thicknesses for the layers is as follows. With the thickness of layer 22 fixed at a value determined by a desired electrical resistivity, thicknesses of layers 18 and 26 are optimized to provide a minimum photopic reflectivity. Next, the thickness value of layer 22 is set to zero and layers 18 and 26 are again optimized (starting from the previously optimized thicknesses) to reproduce, as closely as possible, reflection as a function of wavelength determined from the previous optimization. The thickness of layers 18 and 26 determined in this last optimization may then be used to define regions 27 and 29 of FIG. 5.

Figure 6:
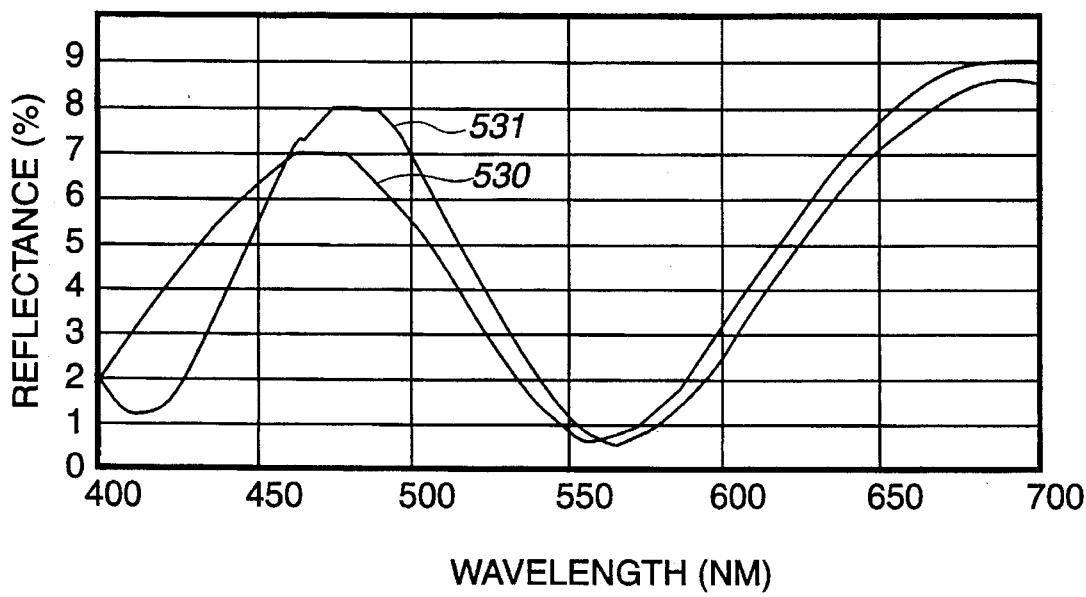
FIG. 6 is a graph schematically illustrating reflection as a function of wavelength for the protective-layer-coated electrode-regions and spaces of the faceplate of FIG. 5.

Referring now to FIG. 6, computed reflection as a function of wavelength from regions 27 and 29 are shown for a faceplate in accordance with FIG. 5, wherein layer 26 is a layer of SiO₂ having a refractive index of about 1.46 and a thickness of about 481 nm; layer 22 is an ITO layer having a refractive index of about 2.05 and a thickness of about 10 nm, and base-coating (layer) 18 is a layer of Al₂O₃ having a refractive index of about 1.65 and a thickness of about 930 nm. Reflection from regions 27 and 29 are indicated respectively by curves 530 and 531.

The similarity of curves 530 and 531 indicates that the curves' strongly wavelength dispersive characteristic, depicted in FIG. 6, is determined primarily by layers 18 and 26. It is believed, without being limited by a particular hypothesis, that layer 22 occupies a nodal position with respect to standing waves created by multiple reflections between layers 18, 22, and 26. Removal of layer 22 therefore has a relatively insignificant effect on a curve's characteristic. By way of contrast, in the prior art example discussed above it is clearly layer 22 which imparts the strongly wavelength dispersive characteristic of curve 443. Removal of the layer eliminates this characteristic and provides weakly dispersive curve 445.

Computed photopic reflectivities of curves 530 and 531 are about 2.69 and 2.87 respectively. The reflectivities are thus, relatively, within ten percent of each other. Curves 530 and 531 provide (Illuminant "C") CIE (1931) (x,y) chromaticity coordinates of x=0.274, y=0.199 (purple) and x=0,259, y=0,288 (bluish-purple) respectively. It has been determined by computer simulation of color and photopic reflectivity (brightness), that this combination of a low photopic reflectivity (less than the photopic reflectivity of an uncoated glass surface), closely matched photopic reflectivity (within ten percent), and similar hue of protective-layer-coated electrode-regions and spaces 27 and 29 may serve to make the electrode-regions and spaces indistinguishable one from another in casual or incidental observation.

Figure 7:
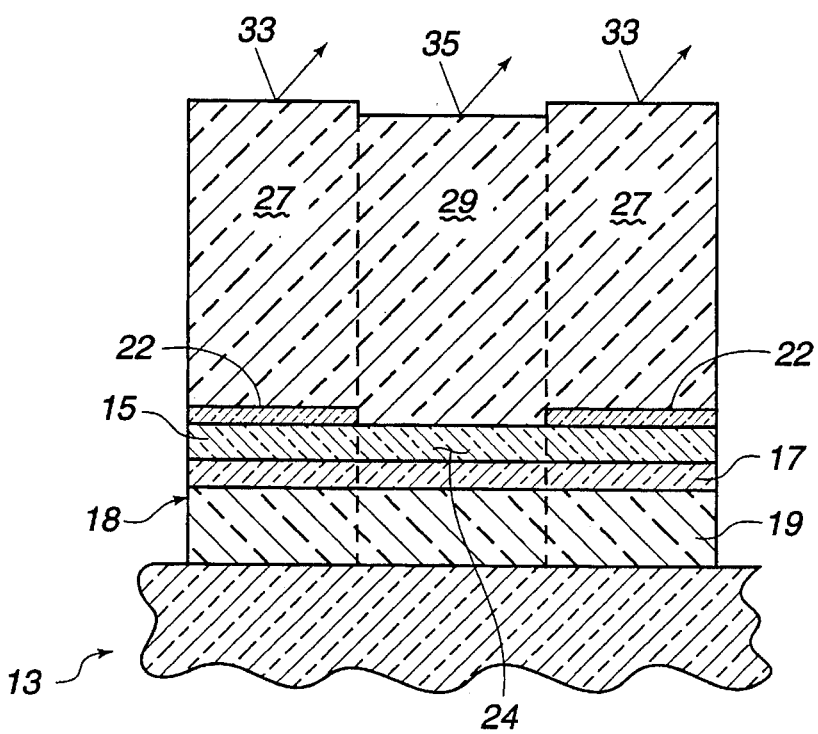
FIG. 7 is a general cross-section view schematically illustrating a portion of the faceplate of FIG. 2, wherein the base-coating comprises three layers.

Referring now to FIG. 7, in another embodiment of 13 of a faceplate in accordance with the present invention, base-coating 18 comprises three layers, 15, 17, and 19, respectively. It is important that layers 15 and 19 have a refractive index greater than the refractive index of substrate 14 but less than the refractive index of layer 22. Layer 17 must have a refractive index greater than the refractive index of layers 15 and 19. Protective-layer-coated electrode-regions and spaces are designated generally by numerals 27 and 29 respectively. Reflection from those regions is indicated by arrows 33 and 35 respectively.

Layer 17 preferably has a thickness between about 8 and 25 nm. Layer 19 preferably has a thickness greater than one-quarter wavelength of visible light but less than one-half wavelength of visible light and Layer 15 preferably has a thickness less than one-quarter wavelength of visible light. For materials practical for forming layers 15, 17 and 19, three-layer base-coating 18 will have a physical thickness between about 100 and 150 nm. Layer 15 may have a physical thickness between about 25 and 45 nanometers; and layer 19 may have a thickness between about 75 and 100 nanometers. Protective-layer 26, here has a refractive index between about 1.35 and 1.65 and preferable less than the refractive index of substrate 14.

One advantage offered by the three-layer base-coating of faceplate 13 is that layer 15 may be a layer of an insulating material such as $Al_2O_3$ and layer 17 may include any of the electrically-conductive metal-oxide materials discussed above. Layer 17 may thus serve as a ground-plane for faceplate 13, the ground plane being used to prevent interference with faceplate operation by electrical emissions from the display device.

In prior art faceplates, a ground plane electrode is usually applied to an innermost surface opposite the surface on which touch-sensitive electrode-region or regions are formed. The faceplate itself serves as an insulator between the ground plane and the touch-sensitive electrode-region or regions of the faceplate.

In a faceplate in accordance with the present invention the ground plane and touch-sensitive electrodes may be formed on a faceplate which is already an integral part of a CRT, i.e., to a faceplate wherein access to the innermost surface thereof is not practically possible.

Another advantage of the faceplate 13 is that three-layer base-coating 18 can be arranged to provide a slightly lower photopic reflection and better reflection color match between electrode-regions and spaces than is possible with the simpler single-layer base-coating 18 of faceplate 12.

Figure 8:
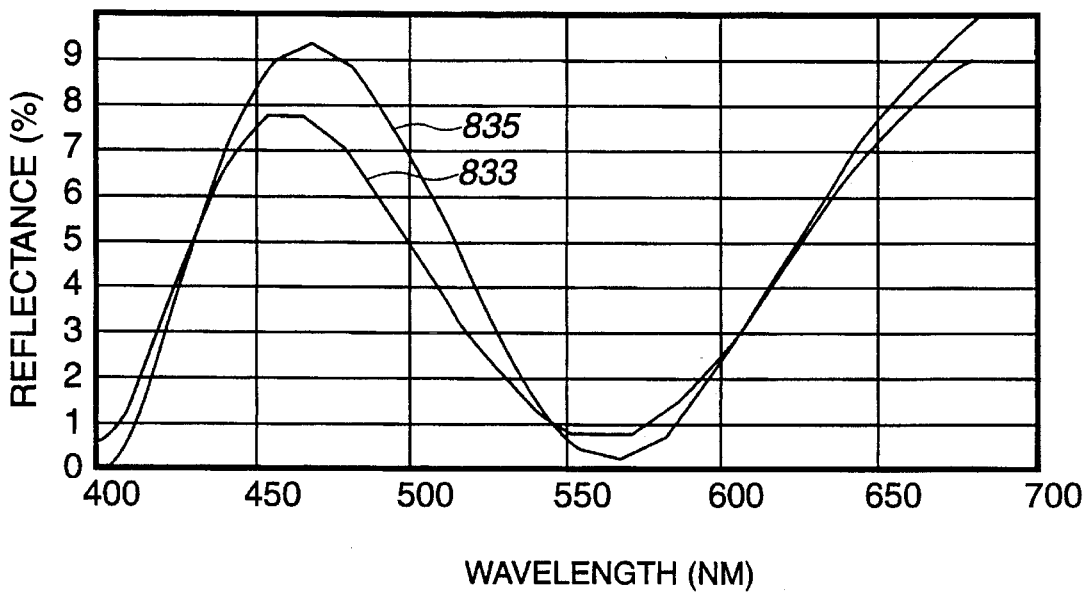
FIG. 8 is a graph schematically illustrating reflection as a function of wavelength for the protective-layer-coated electrode-regions and spaces of the faceplate of FIG. 7.

In FIG. 8, for example, is illustrated computed reflection as a function of wavelength for protective-layer-coated electrode-regions (curve 833) and spaces (curve 835) of faceplate 13, wherein layer 26 is an $SiO_2$ layer having a thickness of 471.3 nm; layers 22 and 17 are ITO layers having a thickness of 10 nm and 20 nm respectively; and layers 15 and 19 are $Al_2O_3$ layers having a thickness of 35.4 nm, and 93 nm respectively.

Computed photopic reflectivities of curves 833 and 835 are about 2.53 and 2.76 respectively. The reflectivities are thus, relatively, within plus ten percent or minus ten percent of each other. Curves 833 and 835 provide (Illuminant "C") CIE (1931) (x,y) chromaticity coordinates of x=0.256, y=0.184 and x=0.239, y=0.184 respectively. Reflection colors of curves 833 and 835 are thus very closely matched in both hue (bluish-purple to purple) and saturation, which would render electrode and space regions essentially indistinguishable one from another, except perhaps under close inspection in bright incident lighting conditions.

One suitable design method for faceplate 13 is similar to that described above for faceplate 12. Having selected materials for layers 26, 22, 15, 17, and 19, and with the thickness of layers 22 and 17 fixed at a value determined by a desired electrical resistivity, first layers 26, 15 and 19 are optimized to provide a minimum photopic reflectivity. The value of layer 22 is next set to zero and layers 26, 15 and 19 are optimized (starting from the previously optimized thicknesses) to reproduce as closely as possible reflection as a function of wavelength determined in the previous optimization. The thickness of layers 26, 15 and 19 determined in this last optimization may then be used to define regions 27 and 29 of FIG. 7.

Those familiar with the art to which the present invention pertains will recognize that base-coating 18 may be formed from more than the three layers discussed above, while still having a total thickness in the range 100 to 150 nm, and without departing from the spirit and scope of the present invention. It is believed, however, that providing more than three layers in base-coating 18 would complicate a manufacturing method while not offering a significant, if any, optical or electrical advantage compared with a three-layer base-coating.

Figure 9:
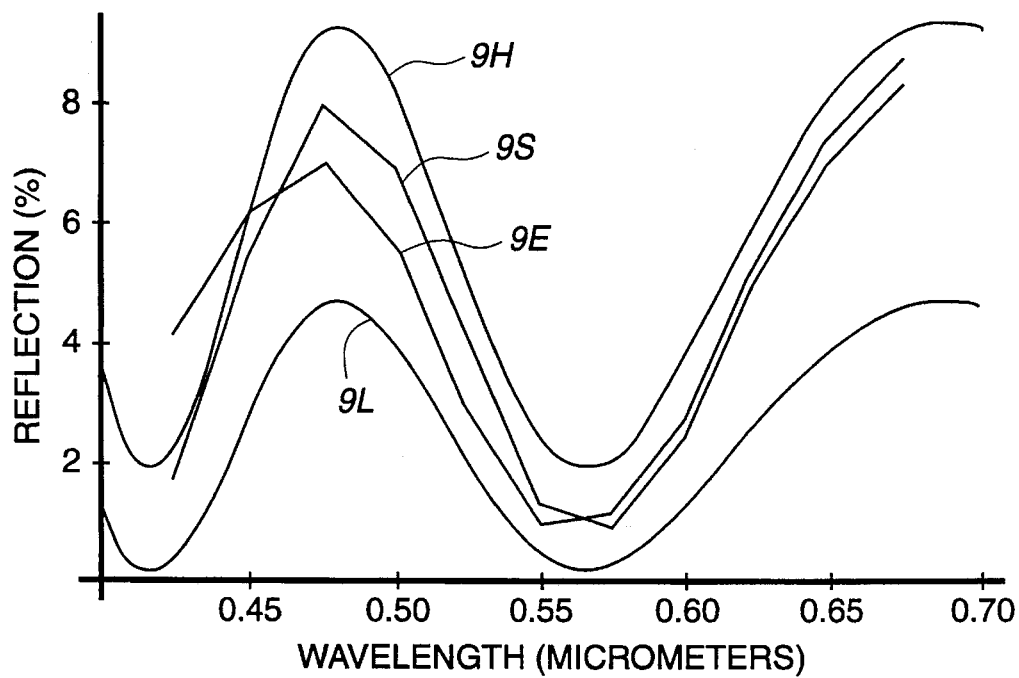
FIG. 9 is a graph schematically illustrating a method of defining a tolerance envelope for optical characteristics of the faceplate of FIG. 5.
Figure 10:
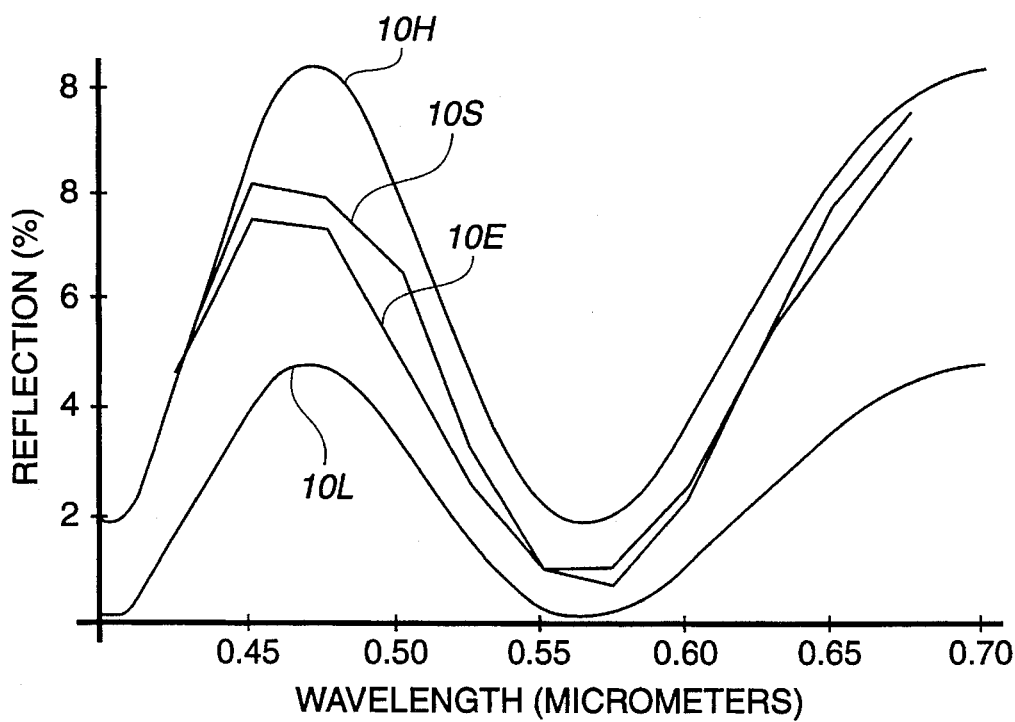
FIG. 10 is a graph schematically illustrating a method of defining a tolerance envelope for optical characteristics of the faceplate of FIG. 7.

Referring now to FIGS. 9 and 10, one method of determining an acceptable tolerance envelope for optical characteristics of a faceplate in accordance with the present invention is illustrated. In FIG. 9, upper and lower bounds of such a tolerance envelope are defined respectively by curves 9H and 9L. Curves 9E and 9S approximate respectively curves 530 and 531 of FIG. 6.

Curve 9H, the upper bound of the envelope, is defined by an equation $$R = 5.600 + 3.688 \operatorname{Sin}\left( \frac{10}{\lambda} - 0.4 \right) \quad (1)$$

Where $\lambda$ is the wavelength in micrometers and R is the reflection in percent at wavelength.

Curve 9L, the lower bound of the envelope, is defined by an equation $$R = 2.410 + 2.284 \operatorname{Sin}\left( \frac{10}{\lambda} - 0.4 \right) \quad (2)$$

It is believed that optical characteristics of a faceplate in accordance with FIG. 5 will be acceptable when either curve 530 or curve 531 falls within the tolerance envelope defined by equation (1) and equation (2) at wavelengths in a range between about 450 and 650 nanometers.

In FIG. 10, upper and lower bounds of such a tolerance envelope are defined respectively by curves 10H and 10L. Curves 10E and 10S approximate respectively curves 833 and 835.

Curve 10H, the upper bound of the envelope, is defined by an equation $$R = 6.090 + 4.246 \operatorname{Sin}\left( \frac{8.9}{\lambda} - 4.78 \right) \quad (3)$$

and curve 10L, the lower bound of the envelope, is defined by an equation $$R = 2.425 + 2.319 \operatorname{Sin}\left( \frac{8.9}{\lambda} - 4.78 \right) \quad (4)$$

It is believed that optical characteristics of a faceplate in accordance with FIG. 7 will be acceptable when either curve 833 or curve 835 falls within the tolerance envelope defined by equation (3) and equation (4) at wavelengths in a range between about 450 and 650 nanometers.

It should be noted that, given typical manufacturing tolerance for the base-coating, electrode, and protective-layers, the curves will not locate independently of each other, but will be related one to the other in the manner described above. As such, if only one curve is in the envelope, the other curve will provide an adequate match for photopic reflection and color, that being a property of the layer arrangement of the present invention. Further, it should be noted that equations (1)–(4) represent just one method of constructing a tolerance envelope for optical characteristics of a faceplate in accordance with the present invention. Those familiar with the art may devise other equations or methods for defining such a tolerance envelope without departing from the spirit and scope of the present invention.

In embodiments of a faceplate of the present invention described above, photopic reflectivity and reflection color of electrode-regions and spaces has been described in terms of light which is incident on a faceplate at normal incidence. Generally, a video display user views the display in a cone of incidence having a half-angle of about ten degrees from normal.

As the reflection characteristics of the electrode-regions and spaces are determined primarily by base-coating or layer 18 and protective-layer 26, then the photopic reflection values and reflection colors of electrode-regions and spaces can be expected to remain relatively closely matched for angles of incidence other than normal, even though the values and colors change with angle of incidence. This is a particularly useful feature of the present invention.

It should be noted that the above-discussed design principles of the present invention apply only when electrode-layers 22 and 17 are formed from a transparent electrically-conductive metal-oxide material having refractive index and extinction coefficient characteristics as discussed above. The requirement for transparent electrically-conductive layers having such characteristics specifically precludes use of metal layers or transition metal nitride layers for layers 22 and 17.

A faceplate in accordance with the present invention would most often be coated in a two-step process wherein all but the protective-layer were first deposited on substrate 14, i.e leaving the electrode-region forming layer uppermost. The electrode-region forming layer would then be etched to form the pattern of electrode-regions and spaces, and, in a second deposition step protective coating 26 would be applied.

In such a two step process a vacuum deposition process such as thermal evaporation or sputtering could be used for depositing layers in the first step. For depositing the protective-layer, which is significantly thicker than the combined thickness, all other layers, a fast, economical deposition process such as a sol-gel process could be used.

In summary, a CRT faceplate for a touch-sensitive video display system has been described. Optical and electrical elements of the faceplate are formed on one surface of the transparent substrate. Electrical elements include a pattern of electrode-regions having spaces therebetween. The electrode-regions are formed on a base-coating which is deposited on the surface of the faceplate, and the electrode-regions and spaces are covered by a protective-layer. The base-coating may include one or more different layers, one of which may be electrically-conductive for forming a ground-plane. The optical characteristics and thickness of the base-coating and the top coating are arranged such that light reflected from the electrode-regions and spaces has about the same photopic brightness and a similar hue.

The present invention has been described and depicted in terms of a preferred and other embodiments. The invention, however, is not limited to the embodiments described and depicted. Rather, the invention is limited only by the claims appended hereto.

What is claimed is:

1. A faceplate for a touch-sensitive video display comprising:

a transparent substrate having a refractive index;

a transparent dielectric base layer deposited on a selected surface of said transparent substrate, said base layer having a thickness between about 70 and 110 nanometers and extending continuously over said selected surface;

a pattern of co-planar, adjacent transparent electrode-regions formed on said dielectric base layer, said electrode-regions having spaces therebetween, and said electrode-regions formed from a transparent conductive layer having a thickness between about 8 and 25 nm;

a transparent dielectric protective-layer covering said electrode-regions and said spaces, said dielectric protective-layer having a thickness greater than about 250 nm; and said transparent conductive layer having a refractive index between about 1.9 and 2.2 and an extinction coefficient less than 0.1, said dielectric base layer having a refractive index greater than the refractive index of said substrate and less than the refractive index of said transparent conductive layer, and said dielectric-protective-layer having a refractive index less than the refractive index of said base layer.

2. The faceplate of claim 1, wherein said protective-layer has a refractive index less than the refractive index of said substrate.

3. The faceplate of claim 1 wherein said base layer includes aluminum oxide; said transparent conductive layer includes a conductive metal-oxide selected from the group consisting of indium-tin oxide, cadmium-tin oxide, antimony-doped tin oxide, and fluorine-doped tin oxide; and said protective-layer includes silicon dioxide.

4. The faceplate of claim 1, wherein, at about normal incidence said protective-layer-covered electrode-regions have a first photopic reflectivity and said protective-layer-covered spaces have a second photopic reflectivity, said first photopic reflectivity having a relative magnitude between about ten percent greater than and ten percent less than the magnitude of said second photopic reflectivity.

5. The faceplate of claim 4, wherein said first and second photopic reflectivities have a magnitude between about 2.5 and 3.0 percent.

6. The faceplate of claim 5 wherein, for CIE Illuminant "C" light at about normal incidence said protective-layer-covered electrode-regions have a first reflection color and said protective-layer-covered spaces have a second reflection color, said first and second reflection colors having CIE (1931) x and y coordinates in a range defined by 0.22<x<0.29 and 0.15<y<0.3.

7. A faceplate for a touch-sensitive video display comprising:

a transparent substrate having a refractive index;

a transparent base-coating deposited on a selected surface of said transparent substrate, said base-coating including three layers and having a thickness between about 100 and 160 nanometers and extending continuously over said selected surface;

a pattern of co-planar, adjacent electrode-regions formed on said base-coating, said electrode-regions having spaces therebetween, and said electrode-regions formed from a transparent conductive layer having a thickness between about 8 and 25 nm;

a transparent protective-layer covering said electrode-regions and said spaces and having a thickness greater than about 250 nm;

said transparent conductive layer having a refractive index between about 1.9 and 2.2 and an extinction coefficient less than 0.1, and said protective-layer having a refractive index between about 1.35 and 1.65;

said three layers of said base-coating designated the first second and third in consecutive numerical order beginning with the layer furthest from said selected surface, said first layer having a refractive index less than the refractive index of said transparent conductive layer, said second layer having a refractive index greater than the refractive index of said first layer, and said third layer having a refractive index less than the refractive index of said transparent conductive layer and greater than the refractive index of said substrate; and said three layers of said base-coating including at least one dielectric layer.

8. The faceplate of claim 7, wherein said first layer of said base-coating has a thickness between about 25 and 45 nanometers, said second layer of said base-coating has a thickness between about 8 and 25 nanometers, and said third layer has a thickness between about 75 and 100 nanometers.

9. The faceplate of claim 7 wherein said first layer of said base-coating includes aluminum oxide and said second layer includes a conductive metal-oxide selected from the group consisting of indium-tin oxide, cadmium-tin oxide, antimony-doped tin oxide, and fluorine-doped tin oxide.

10. The faceplate of claim 9 wherein said third layer of said base-coating includes aluminum oxide.

11. The faceplate of claim 7, wherein, at about normal incidence said protective-layer-covered electrode-regions have a first photopic reflectivity and said protective-layer-covered spaces have a second photopic reflectivity, said first photopic reflectivity having a relative magnitude between about ten percent greater than and ten percent less than the magnitude of said second photopic reflectivity.

12. The faceplate of claim 11, wherein said first and second photopic reflectivities have a magnitude between about 2.4 and 2.9 percent.

13. The faceplate of claim 12 wherein, for CIE Illuminant "C" light at about normal incidence said protective-layer-covered electrode-regions have a first reflection color and said protective-layer-covered spaces have a second reflection color, said first and second reflection colors having CIE (1931) x and y coordinates in a range defined by $0.22 < x < 0.29$ and $0.15 < y < 0.3$.

14. The faceplate of claim 7 wherein said protective layer has a refractive index less than the refractive index of said substrate.

* * * * *